United States Patent
Fischer et al.

(10) Patent No.: US 10,029,291 B2
(45) Date of Patent: *Jul. 24, 2018

(54) DEVICES AND METHODS FOR LANDFILL GAS WELL MONITORING AND CONTROL

(71) Applicant: Q.E.D. Environmental Systems, Inc., Dexter, MI (US)

(72) Inventors: David A. Fischer, Ann Arbor, MI (US); David Mioduszewski, Dexter, MI (US)

(73) Assignee: Q.E.D. Environmental Systems, Inc., Dexter, MI (US)

( * ) Notice: Subject to any disclaimer, the term of this patent is extended or adjusted under 35 U.S.C. 154(b) by 177 days.

This patent is subject to a terminal disclaimer.

(21) Appl. No.: 14/692,223

(22) Filed: Apr. 21, 2015

(65) Prior Publication Data

US 2015/0226045 A1    Aug. 13, 2015

Related U.S. Application Data

(63) Continuation-in-part of application No. 13/794,242, filed on Mar. 11, 2013, now Pat. No. 9,062,536.

(Continued)

(51) Int. Cl.
*B09B 1/00* (2006.01)
*E21B 43/12* (2006.01)
(Continued)

(52) U.S. Cl.
CPC .............. *B09B 1/006* (2013.01); *E21B 34/02* (2013.01); *E21B 43/12* (2013.01); *E21B 44/00* (2013.01)

(58) Field of Classification Search
CPC ..................................................... B09B 1/006
See application file for complete search history.

(56) References Cited

U.S. PATENT DOCUMENTS 4,026,355 A    5/1977   Johnson et al.
4,159,893 A    7/1979   Ham
(Continued)

FOREIGN PATENT DOCUMENTS

CN        1748072 A     3/2006
CN      201100122 Y     8/2008
(Continued)

OTHER PUBLICATIONS

Supplementary European Search Report for corresponding European Patent Application No. EP13870001 dated Aug. 24, 2016, 7 pages.

(Continued)

*Primary Examiner* — John J Kreck
(74) *Attorney, Agent, or Firm* — Harness, Dickey & Pierce, P.L.C.

(57) ABSTRACT

A landfill well control system is disclosed which provides the ability to input a user selected set point to control a flow related variable at a landfill wellhead. A flow control actuator controls movement of a landfill gas (LFG) flow control valve. A sensor may be used for sensing the flow related variable. A controller is operably associated with the flow control actuator and the sensor. A user interface has a set selection for enabling a set point associated with the flow related variable, which is to be controlled by the system, to be input by the user. The controller operates to control the LFG flow control valve as needed to maintain the set point in an autopilot-like fashion.

19 Claims, 8 Drawing Sheets

Related U.S. Application Data

(60) Provisional application No. 61/748,370, filed on Jan. 2, 2013.

(51) Int. Cl.
*E21B 44/00* (2006.01)
*E21B 34/02* (2006.01)

(56) References Cited

U.S. PATENT DOCUMENTS

| | | | |
|---|---|---|---|
| 4,444,041 A | 4/1984 | Zison | |
| 4,770,676 A | 9/1988 | Sircar et al. | |
| 4,890,672 A | 1/1990 | Hall | |
| 5,063,519 A | 11/1991 | Zison | |
| 5,311,851 A | 5/1994 | Wright, Jr. | |
| 5,355,739 A | 10/1994 | Cooper et al. | |
| 5,373,897 A * | 12/1994 | Skarvan | E21B 43/121 166/250.03 |
| 5,611,844 A | 3/1997 | Troost et al. | |
| 5,616,841 A * | 4/1997 | Brookshire | B09B 1/00 138/44 |
| 5,695,641 A | 12/1997 | Cosulich et al. | |
| 5,706,896 A | 1/1998 | Tubel et al. | |
| 5,983,164 A | 11/1999 | Ocondi | |
| 6,169,962 B1 | 1/2001 | Brookshire et al. | |
| 6,356,205 B1 | 3/2002 | Salvo et al. | |
| 6,393,821 B1 | 5/2002 | Prabhu | |
| 6,446,014 B1 | 9/2002 | Ocondi | |
| 6,591,695 B1 | 7/2003 | Brookshire et al. | |
| 6,799,477 B2 | 10/2004 | Brookshire et al. | |
| 6,999,883 B1 | 2/2006 | Brady et al. | |
| 7,056,537 B2 | 6/2006 | Weschler | |
| 7,198,433 B2 | 4/2007 | Augenstein et al. | |
| 7,448,828 B2 | 11/2008 | Augenstein et al. | |
| 7,591,866 B2 | 9/2009 | Bose | |
| 7,704,291 B2 | 4/2010 | Bose | |
| 7,731,779 B2 | 6/2010 | Palumbo | |
| 7,972,082 B2 | 7/2011 | Augenstein et al. | |
| 8,021,612 B2 | 9/2011 | Tooley | |
| 8,155,764 B2 | 4/2012 | Castelijns et al. | |
| 8,163,242 B2 | 4/2012 | Elkins | |
| 8,168,121 B2 | 5/2012 | Elkins | |
| 8,186,211 B2 | 5/2012 | Boult et al. | |
| 8,944,014 B2 * | 2/2015 | Cutlip | E21F 7/00 123/3 |
| 9,062,536 B2 * | 6/2015 | Fischer | B09B 1/006 |
| 2001/0005812 A1 * | 6/2001 | Brookshire | B09B 1/00 702/6 |
| 2007/0225923 A1 * | 9/2007 | Tooley | G05B 13/048 702/47 |
| 2008/0154510 A1 | 6/2008 | Scott | |
| 2010/0145636 A1 * | 6/2010 | Nyfors | G01F 1/584 702/49 |
| 2011/0179349 A1 | 7/2011 | Rogers et al. | |
| 2011/0231099 A1 | 9/2011 | Elkins | |
| 2011/0231109 A1 | 9/2011 | Furuhashi et al. | |
| 2012/0191349 A1 | 7/2012 | Lenz et al. | |
| 2012/0206715 A1 | 8/2012 | Laub | |
| 2012/0297868 A1 | 11/2012 | Elkins | |
| 2013/0270006 A1 | 10/2013 | Selman et al. | |
| 2013/0275047 A1 | 10/2013 | Selman et al. | |
| 2014/0182846 A1 | 7/2014 | Fischer et al. | |

FOREIGN PATENT DOCUMENTS

| | | |
|---|---|---|
| CN | 102896131 A | 1/2013 |
| KR | 20120023267 A | 3/2012 |

OTHER PUBLICATIONS

Watson, Anne; "Landfill: The Little Landfill that Could," Waste360.com; Aug. 1, 2002, (pp. 1-3); http://waste360.com/mag/waste_little_landfill.

SIPO 1st Office Action and Search Report issued in Chinese Patent Application No. 2013800691342, dated Aug. 14, 2017, 11 pages.

* cited by examiner

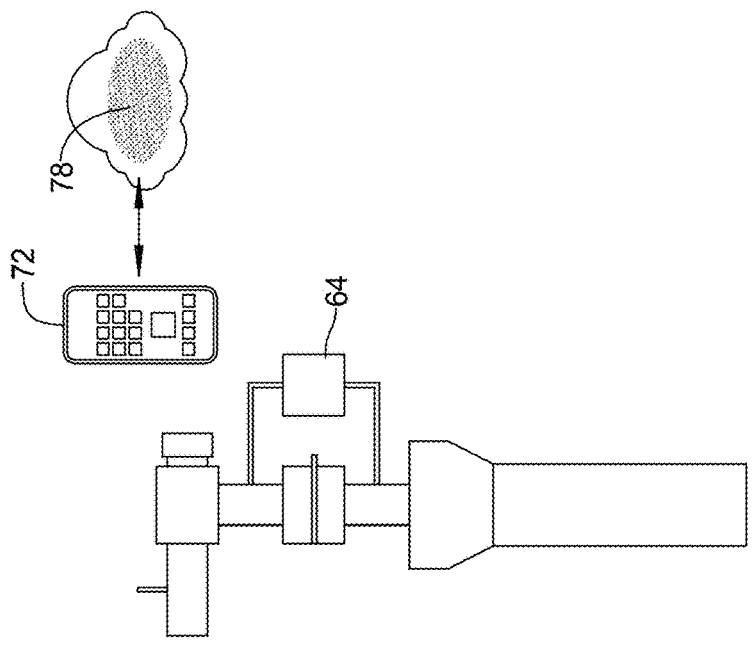
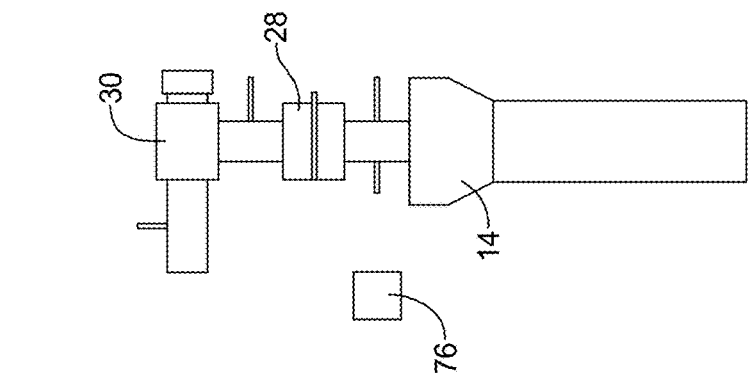
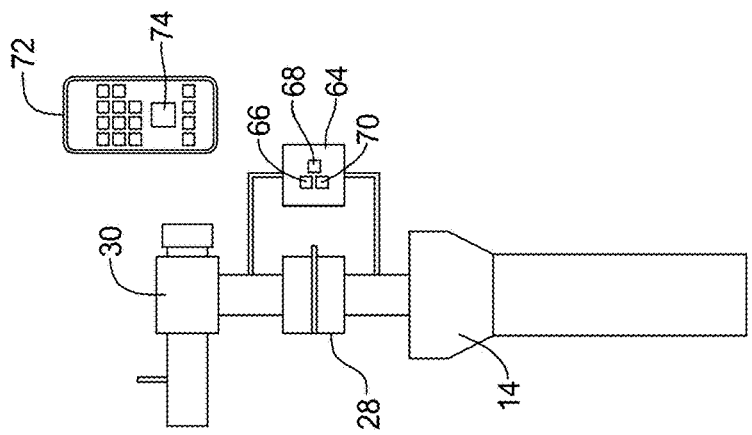

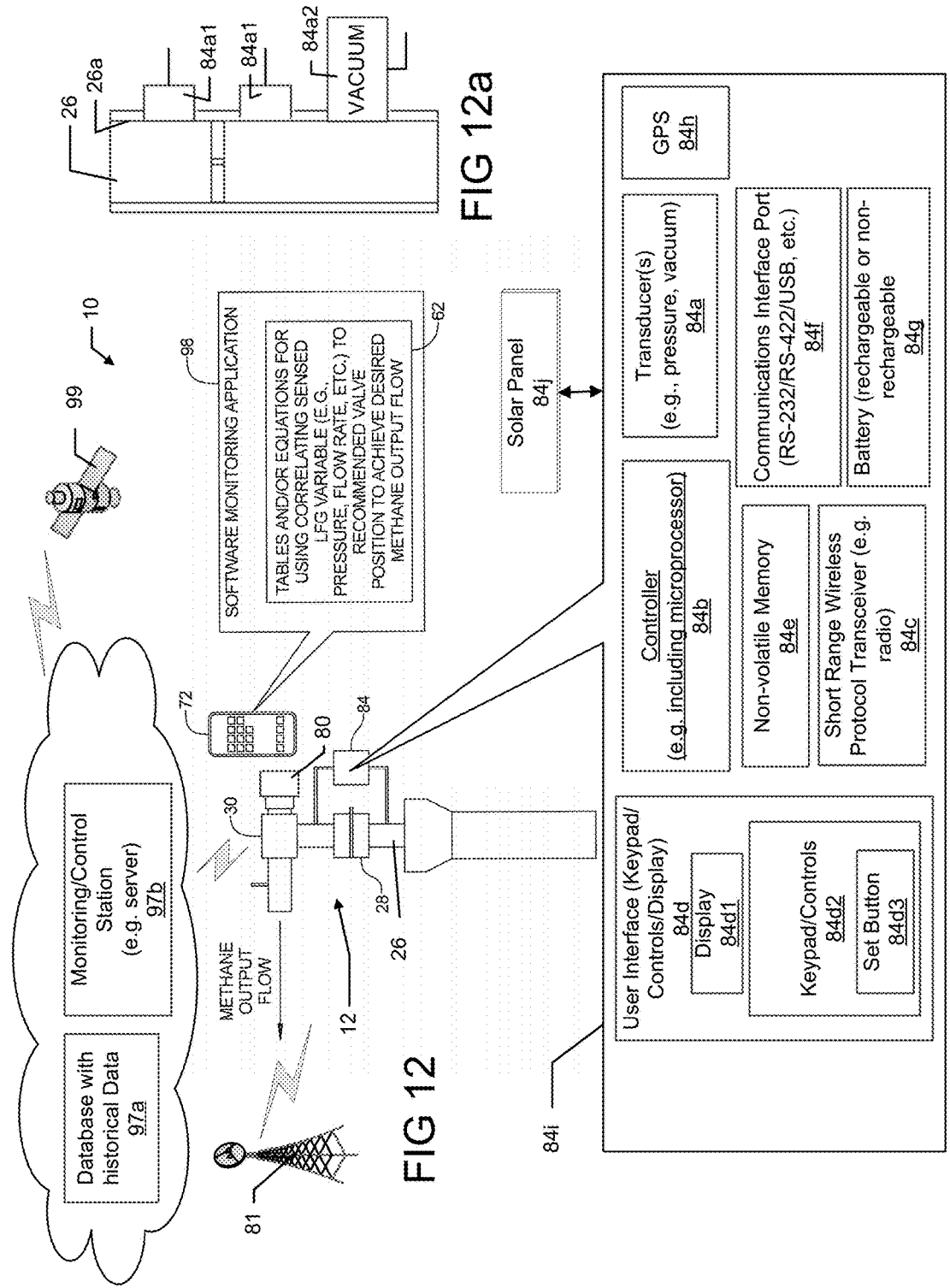

DEVICES AND METHODS FOR LANDFILL GAS WELL MONITORING AND CONTROL

CROSS-REFERENCE TO RELATED APPLICATIONS

This application is a continuation-in-part of U.S. non-provisional application Ser. No. 13/794,242, filed Mar. 11, 2013 (allowed), which claims the benefit of U.S. provisional application No. 61/748,370, filed on Jan. 2, 2013. The entire disclosures of the above applications are incorporated herein by reference.

FIELD

The present disclosure relates to a system and method for monitoring gas produced by landfills, and more particularly to a system and method for monitoring a variable at a wellhead of a landfill well that includes an autopilot-like feature by which a set point can be programmed and the system will control the variable, in real time, to maintain the desired set point without further user intervention.

BACKGROUND

This section provides background information related to the present disclosure which is not necessarily prior art.

Active and inactive domestic solid waste landfills in the United States require the installation of systems to control and capture methane produced by the anaerobic processes breaking down the waste. Safety, gas capture for energy use, and greenhouse gas control because methane has 25 times the greenhouse gas impact of CO2, are some of the reasons these systems are installed. Additionally, regulations govern methane gas emissions for air pollution and safety reasons. While some landfills employ passive flare systems to burn off the methane, the present trend is to employ controlled systems that use a vacuum pump, piping and wells to draw the methane to a central location at the landfill site for use generating electricity or for gas recovery.

Data is currently collected from the numerous extraction points such as gas well heads, often as frequently as once a week. A typical landfill may consist of approximately 50 to several hundred wells and well heads. The frequency of data collection, combined with the number of data collection points, creates a large, multivariate data set that grows over time. This data known as landfill gas (LFG) data is typically stored in spreadsheets or enterprise level environmental databases. Current data use focuses on flagging exceedences, some charting and some data trend mapping as related to GPS location of the well points. Control decisions at each well head are primarily based on fixed "rules" and tend not to utilize LFG data from historical data sets. Additionally, the analysis of historical data sets for time and space trends and relationships are not used to create control modification recommendations such as positioning of control valves at the well heads.

SUMMARY

This section provides a general summary of the disclosure, and is not a comprehensive disclosure of its full scope or all of its features.

In one aspect the present disclosure relates to a landfill well control system comprising a landfill gas (LFG) wellhead flow control valve and a flow control actuator for controlling movement of the LFG flow control valve. A sensor may be included for sensing a flow related variable. A controller may also be included which is operably associated with the flow control actuator and the sensor. A user interface may be included which has a set selection for enabling a set point associated with the flow related variable, which is to be controlled by the system, to be input to the system by the user. The controller operates to control the LFG flow control valve as needed to maintain the set point in an autopilot-like fashion.

In another aspect the present disclosure relates to a landfill well control system having a landfill gas (LFG) flow control valve and an electrically powered flow control actuator for controlling movement of the LFG flow control valve. A sensor may be included for sensing a flow related variable. A combination unit may be included which is in communication with the electrically powered flow control actuator. The combination unit may include a controller, a non-volatile memory and a user interface. The controller may be in communication with the sensor and the electrically powered flow control actuator. The non-volatile memory may also be in communication with the controller. The user interface may be in communication with the controller and may include a set selection for enabling a set point associated with the flow related variable, which is to be controlled by the system, to be input to the combination unit by a user. The controller thereafter operates to control the LFG flow control valve as needed to maintain the set point in an autopilot-like fashion.

In still another aspect the present disclosure relates to a method for controlling a flow of a landfill gas (LFG) through a wellhead at a landfill well. The method may comprise providing a landfill gas (LFG) flow control valve and using a flow control actuator for controlling movement of the LFG flow control valve. The method may further involve using a sensor for sensing a flow related variable, and using a controller to electronically communicate with the sensor and to control the flow control actuator. A user interface may be used which includes a set selection for enabling a set point associated with the flow related variable, which is to be controlled by the system, to be input by a user. The controller may thereafter be used to control the flow control actuator, to in turn control the LFG flow control valve, as needed to maintain the set point input by the user in an autopilot-like fashion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a front elevational view of a well head assembly and control valve control/operating system modified from FIG. 2;

FIG. 6 is a front elevational view of a well head assembly and control valve control/operating system modified from FIG. 2;

FIG. 7 is a front elevational view of a well head assembly and control valve modified from FIG. 2;

FIG. 12 is a diagram of components for a well head assembly and control valve of the present disclosure which is used to implement an "auto pilot" or "cruise control" like closed loop system for maintaining a user desired set point;

FIG. 12a is a simplified side cross sectional view illustrating a flush mounting of a sensor face with an inside wall surface of a pipe extension;

Figure 2:
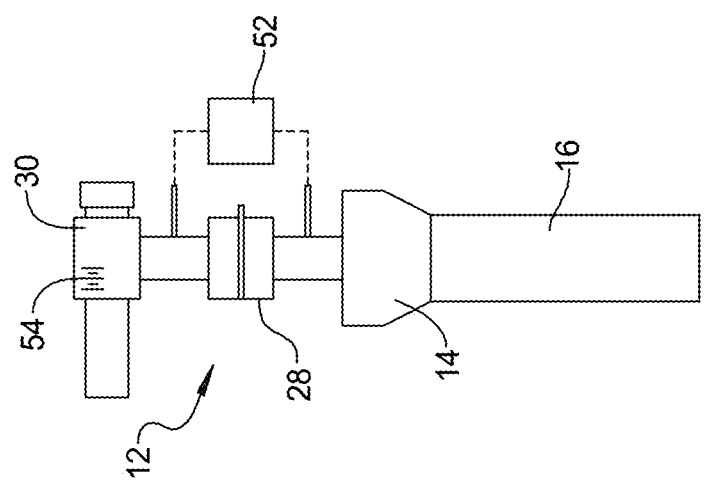
FIG. 2 is a front elevational view of a portion of the well head assembly and control valve control/operating system of FIG. 1.
Figure 13:
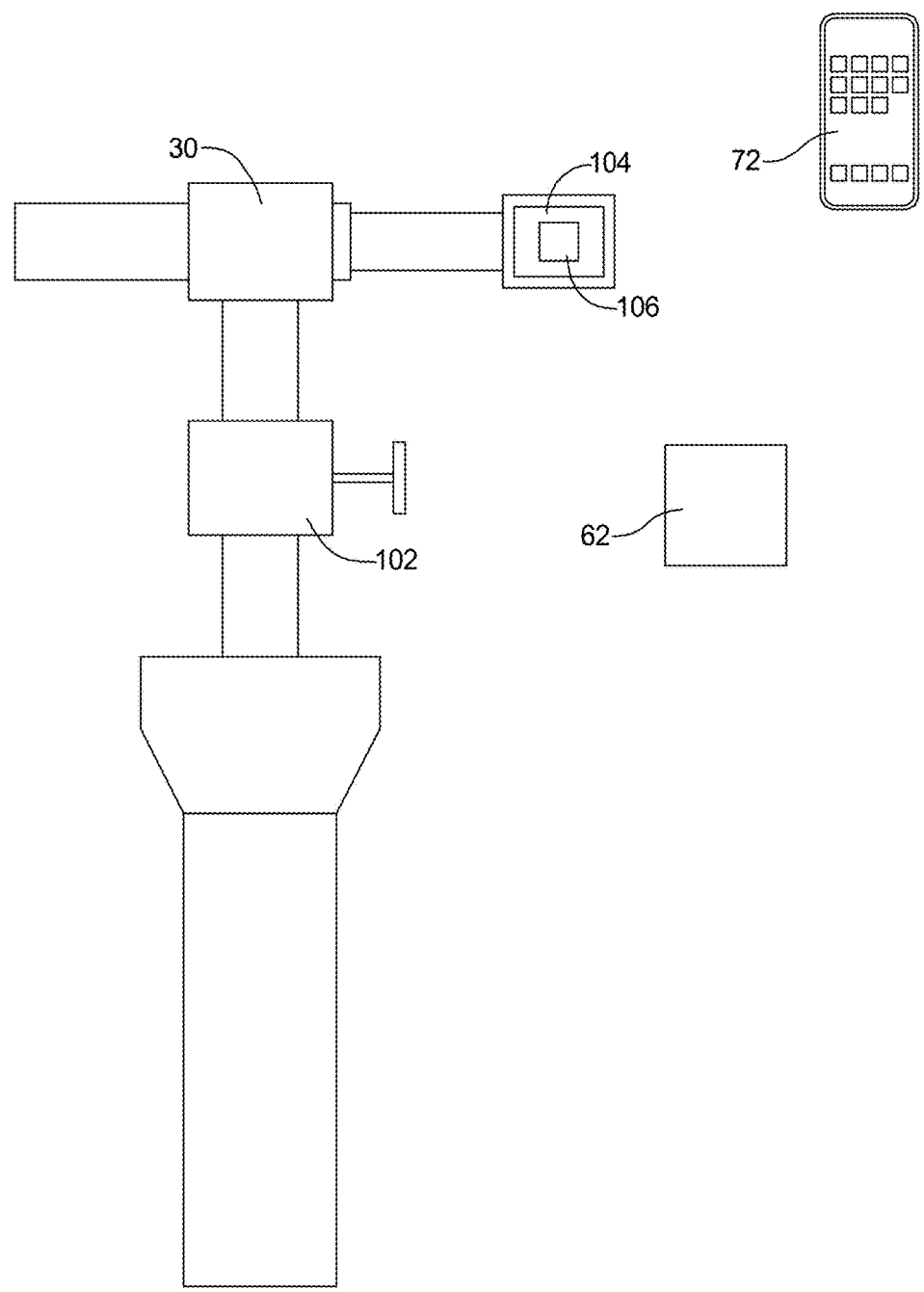
Figure 14:
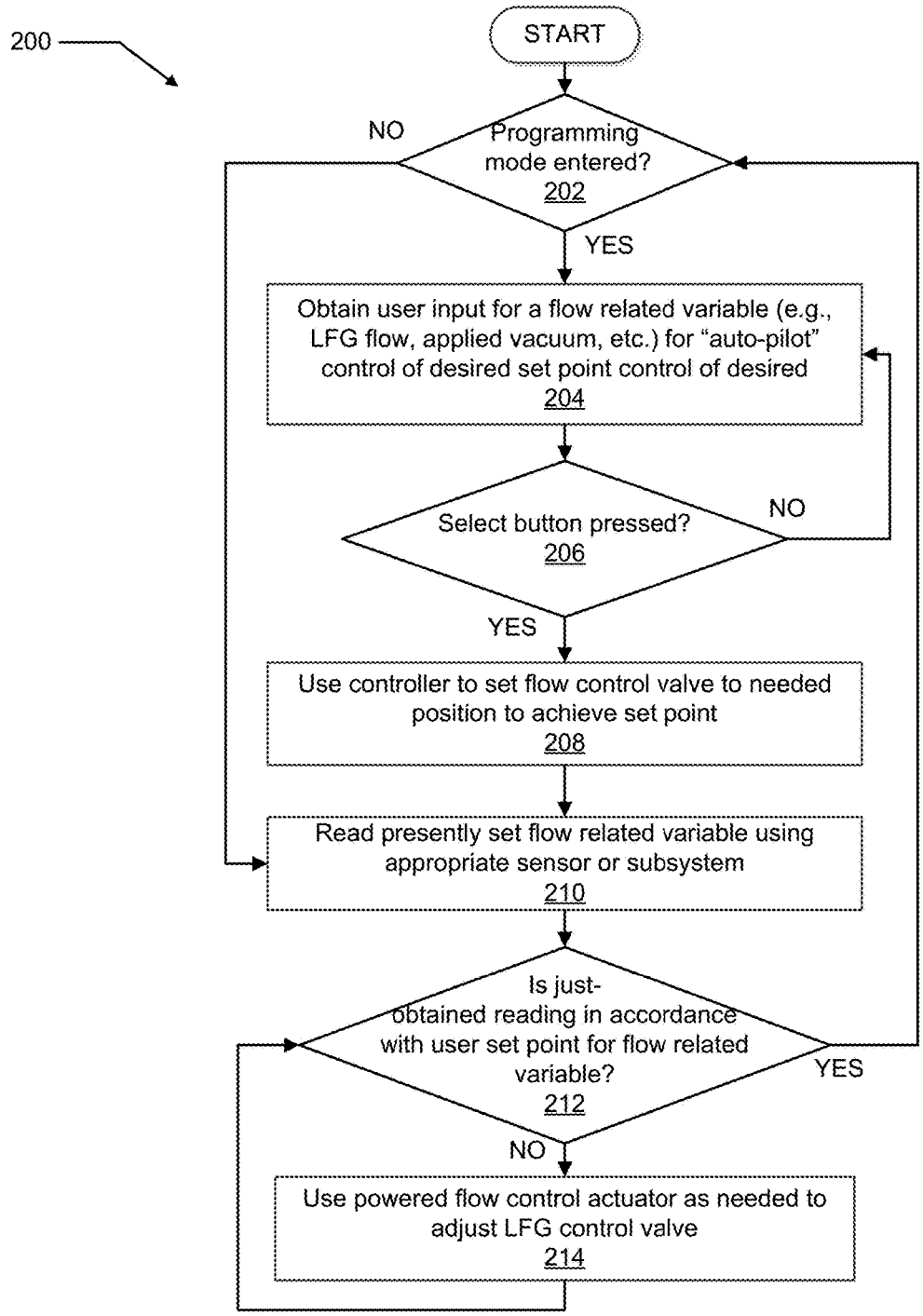

FIG. 13 is a front elevational view of a well head assembly and control valve control/operating system modified from FIG. 2; and FIG. 14 is a flowchart illustrating one example of a methodology that may be implemented using the system of FIG. 12 to achieve automatic, closed loop control over a flow related variable being monitored by the system (i.e., an "autopilot" or "cruise control" like automated control).

Corresponding reference numerals indicate corresponding parts throughout the several views of the drawings.

DETAILED DESCRIPTION

Example embodiments will now be described more fully with reference to the accompanying drawings.

Figure 1:
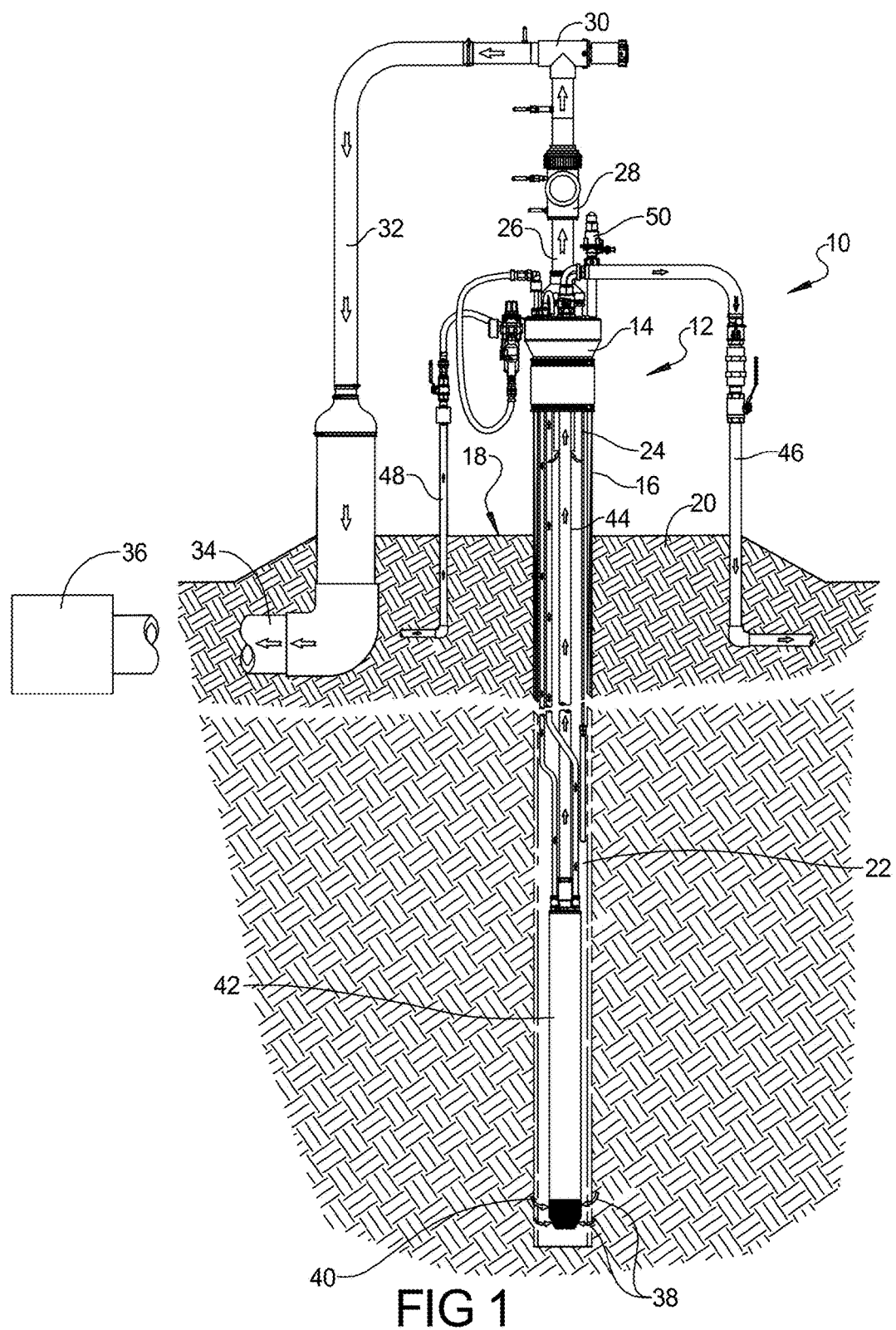
FIG. 1 is a partial cross sectional front elevational view of a landfill well assembly and associated equipment and piping having a control/operating system of the present disclosure.

Referring to FIG. 1, a typical landfill well system 10 includes a well head assembly 12 having a well head 14 mounted to a plastic well pipe 16, which is typically a six inch or eight inch pipe. Well pipe 16 can extend approximately three to four feet above a ground surface 18 of a multiple layer landfill gradient 20, or can be terminated at or below grade or ground surface 18 such that the well head 14 is positioned in a below-ground vault or enclosure. Well pipe 16 includes multiple holes 22 in a zone extending approximately thirty to over one hundred feet below the ground surface 18 that permit influx of landfill gas into the well pipe 16. Landfill gas is drawn into the well pipe 16 into a well discharge pipe 24 that can include an above ground discharge pipe extension 26. The methane gas then passes through multiple components including an orifice assembly 28 used to measure gas flow rate, and a control valve 30 used to meter gas flow rates, and is transferred via a flow pipe 32 to a larger collection pipe 34. Collection pipe 34 is commonly connected to a vacuum producing device 36 which assists in drawing out the methane gas. Well head assembly 12 provides for, and landfill well system 10 can further include a plurality of influent apertures 38 near the bottom end of well pipe 16 that allow liquid known as "leachate" to collect at a well pipe foot 40 which before reaching apertures 38 is discharged using a pump 42, via an in-well fluid discharge pipe 44 and an external well fluid discharge pipe 46. Other services provided by well head assembly 12 include an air inlet line 48 used to power pump 42 and a well fluid level detector 50.

Referring to FIG. 2, devices and methods to target the LFG well head assembly 12 include a flow control means in the form of flow control valve 30, a pressure gradient producing means in the form of orifice assembly 28 and a pressure drop measurement device 52. Flow control valve 30 is designed to create a repeatable and finely adjustable gas flow rate when controlling LFG flow outward from the well pipe 16 to the vacuum producing device 36. Flow control valve 30 can additionally have indexing marks 54 allowing a valve position to be recorded and enhance repeatability of the valve position for a given gas flow rate and/or for a given set of well operating parameters such as temperature, barometric pressure, humidity, and the like.

Figure 3:
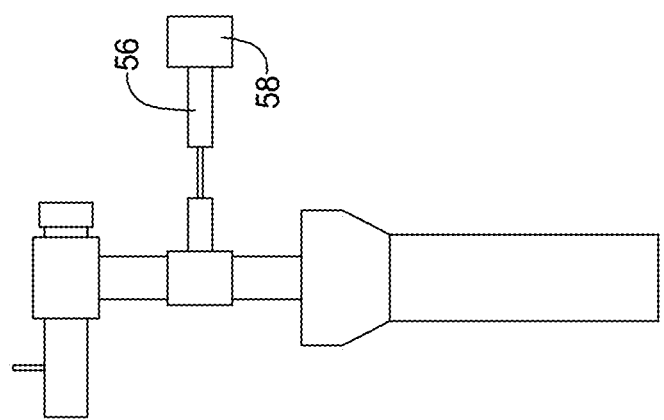
FIG. 3 is a front elevational view of a well head assembly and control valve control/operating system modified from FIG. 2.

Referring to FIG. 3, according to several aspects, a variation on the system of FIG. 2 is provided by the use of a mass flow rate device 56 for reading LFG flow rate. The mass flow rate device 56 is used in place of pressure drop measurement device 52. Mass flow rate device 56 can include a wireless transmitter 58 used to electronically send mass flow rate measurements remotely.

Figure 4:
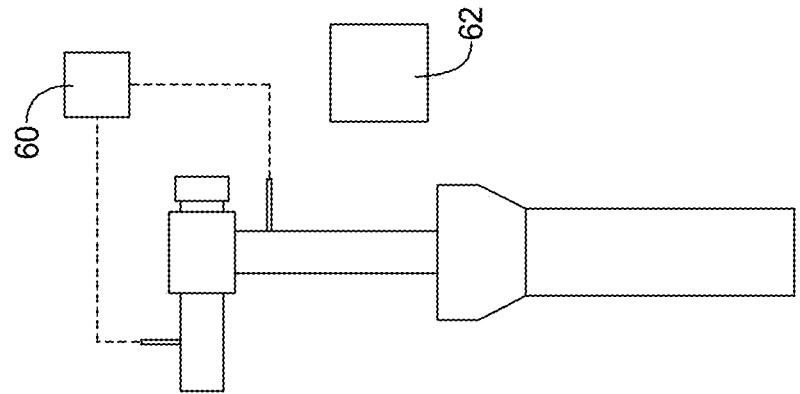
FIG. 4 is a front elevational view of a well head assembly and control valve control/operating system modified from FIG. 2.

Referring to FIG. 4, according to further aspects, a variation on the system of FIGS. 2 and 3 is to use a pressure drop measurement device 60 connected across the flow control valve 30 in combination with the flow control valve indexing marks 54 to provide and reproduce the LFG flow rate. A set of printed or electronic tables 62 or equations are used to map a relationship between the valve position of flow control valve 30 and the indicated differential pressure, resulting in an LFG flow rate measurement.

Referring to FIG. 5, a further variation on the systems of FIGS. 2-4 is to use a differential measurement device 64, having an internal pressure transducer 66, a micro-controller 68 and a wired or wireless communications means 70 (such as but not limited to a suite of high level communication protocols using small, low-power digital radios based on an IEEE 802 standard for personnel area networks, or wireless technology standards for exchanging data over short distances (using for example short-wavelength radio transmissions in the ISM band from 2400-2480 MHz) from fixed and mobile devices, long range cellular radio, or the like) to send the differential pressure measured by differential measurement device 64 to a mobile hand-held device 72, such as a smart phone or tablet. The differential measurement device 64 can be used portably or can be dedicated to the LFG well head 14. Mobile hand-held device 72 can include a program 74 allowing the input of a pressure drop device specification. For example, for the system of FIG. 2, this could be an orifice size of the orifice assembly 28. As a further example, this could be the flow control device index position indicated by the indexing marks 54 of flow control valve 30, which allows calculation of LFG flow rate. Further, hand-held device 72 can also be used to identify or control a landfill gas quality such as methane, carbon dioxide, and/or oxygen levels.

Referring to FIG. 6 and again to FIGS. 1-5, the previous devices and methods can further include the sampling of other LFG data 76, as required. LFG data 76 can include LFG well head vacuum or pressure, LFG gas quality data, LFG gas temperature, site or ambient data readings such as barometric pressure, air temperature, and the like, and/or a geospatial location of the LFG well head 14.

Referring to FIG. 7, the systems described in FIGS. 5 and 6 can be further expanded by providing a data storage device 78 in communication with the mobile hand-held device 72, such that historical data and other information is accessible in the data storage device 78 at the time new data is being acquired. In addition to basic data storage, various data processing techniques can be used to provide recommended flow control valve 30 position adjustments, in near real time, to optimize the LFG well operation toward achieving system goals, such as maximizing methane recovery and/or minimizing LFG migration. Location-specific historical data and analysis can be further expanded to include one or more nearby LFG well heads 14-14n and the details of each well head's historical readings and control set points.

Referring to FIG. 8 and again to FIGS. 1-7, a powered flow control device actuator 80 can be added to the flow control valve 30, thereby providing accurate and repeatable positioning of flow control valve 30. The addition of powered flow control device actuator 80 provides an "automatic indexing" of the flow control valve 30 position. Automatic valve indexing/positioning can be provided by an embedded micro-controller 82 and logic and/or portable mobile, wired or wireless device, such as mobile hand-held device 72 providing remote control of the communication enabled, powered flow control device actuator 80.

Referring to FIG. 9 and again to FIGS. 1-8, a combination unit 84 having a valve actuator and flow measurement device, plus a micro-controller 86, at least one vacuum/pressure sensor 88, an LFG temperature sensor 90 and/or other measureable parameter sensors can be used to provide local, automatic valve position setting. Combination unit 84 can include various control and measurement schemes that are used to obtain a specific control point setting, such as maintaining set levels of landfill gas flow rate or setting levels of vacuum applied to the well. Combination unit 84 can additionally add the various data elements described in reference to FIG. 6 to provide further basis for control setting changes. Combination unit 84 can be controlled remotely for example from an off-site wireless device or satellite signal.

Figure 8:
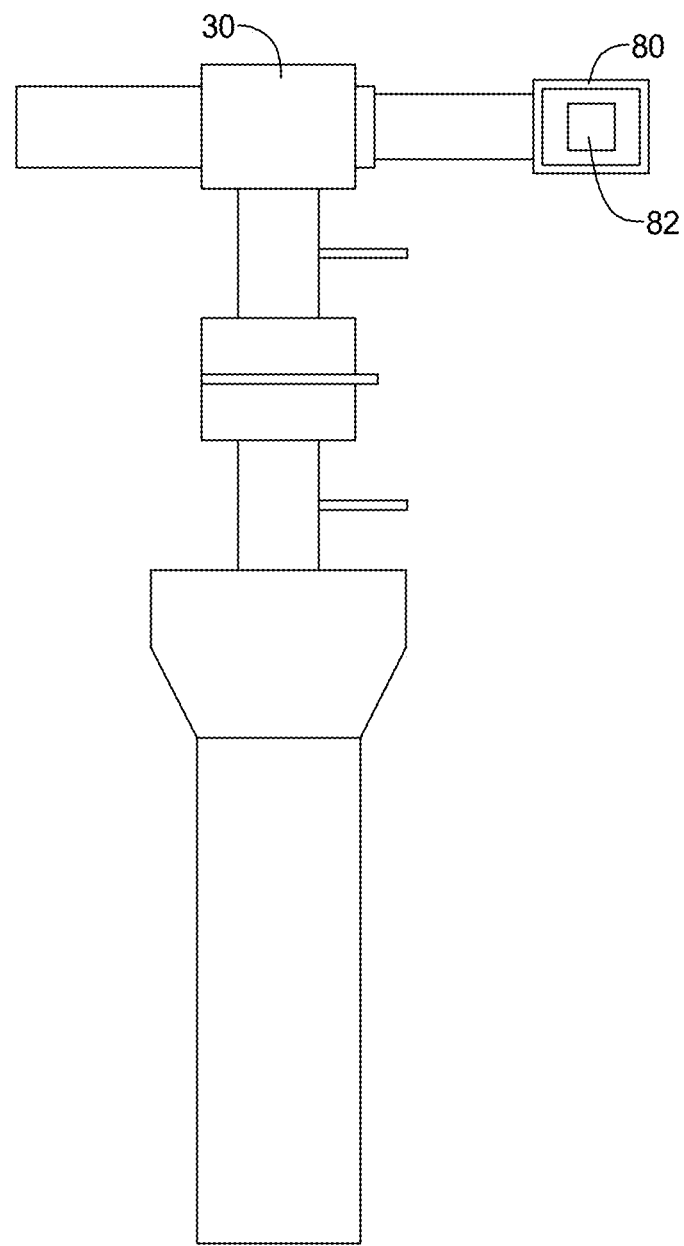
FIG. 8 is a front elevational view of a well head assembly and control valve control/operating system modified from FIG. 2.
Figure 10:
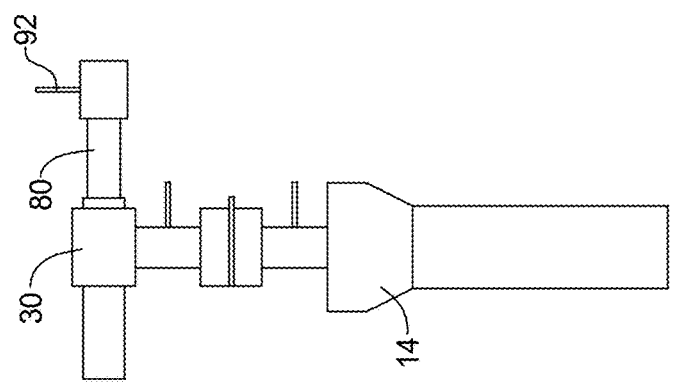
FIG. 10 is a front elevational view of a well head assembly and control valve control/operating system modified from FIG. 2.
Figure 9:
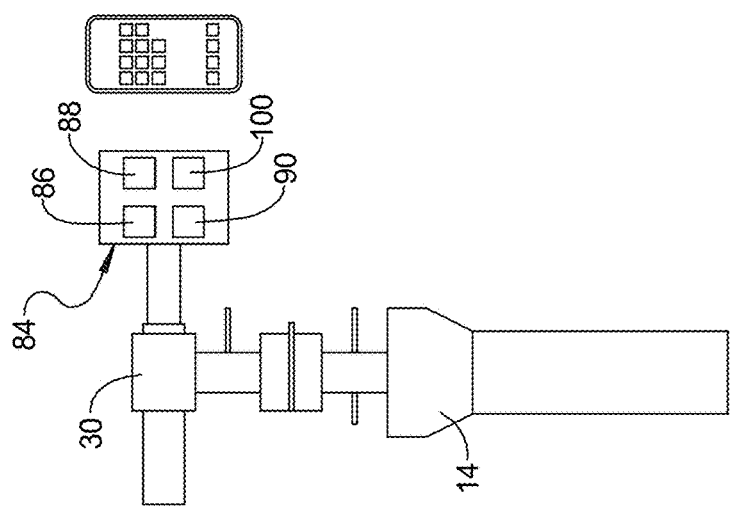
FIG. 9 is a front elevational view of a well head assembly and control valve control/operating system modified from FIG. 2.

Referring to FIG. 10 and again to FIGS. 2-9, the powered flow control device actuator 80 described in reference to FIG. 8 can be further provided with a wired or wireless communications device 92 to communicate and change the valve position with a mobile hand-held device, such as mobile hand-held device 72. Mobile hand-held device 72 can include a program to assist in valve settings. This combination allows the use of flow measurement, as described in reference to FIG. 6 to provide feedback for control changes. Additional data elements, as described in reference to FIGS. 6 and 9 can be integrated into the control logic.

Figure 11:
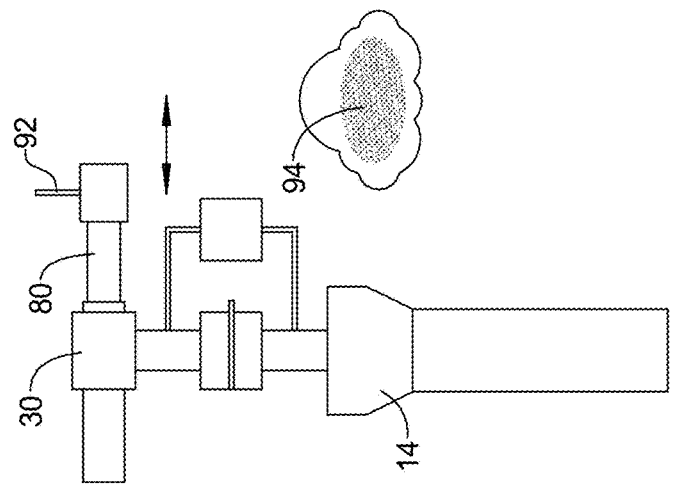
FIG. 11 is a front elevational view of a well head assembly and control valve control/operating system modified from FIG. 2.

Referring to FIG. 11 and again to FIGS. 1-10, data and control schemes can be as described in reference to FIG. 7, to include historical and "cloud data" enhanced elements 94. Additionally, embedded wireless communications device 92 is provided to the powered flow control device actuator 80, such that valve positioning can be accomplished remotely and therefore not require the mobile hand-held device 72. As described in reference to FIG. 10, wireless communications device 92 can be combined with additional data elements, as described in reference to FIG. 5, to provide the operator with context and feedback for control valve changes. In addition, remote access to historical multiple LFG well head data sets, LFG well head data for nearby and all site LFG well heads, advanced well head and site models, control algorithms, and the like as described in reference to FIG. 7 can optimize LFG control for the overall landfill site. Operator assisted control and potentially automatic control of the entire operating landfill are therefore provided. Simpler remote readout of LFG flow rate, valve position, vacuum, pressures, temperatures, and the like are also provided.

Referring to FIG. 12 and again to FIGS. 1-11, landfill well system 10 can provide the wellhead assembly 12 with a self-regulating LFG wellhead gas flow control valve 30 that includes electronically controlled, powered flow control device actuator 80, and a flow measurement element such as an orifice plate or pitot tube as orifice assembly 28 that produces differential pressures proportional to landfill gas flow rate. The combination unit 84 in this example may include sensors and/or electrical subsystems associated with one or more transducers 84a, a controller 84b, such as a microprocessor, with control logic capability and the ability to communicate locally via a short range, wireless digital transceiver 84c (i.e., digital radio). The controller 84b may be in electrical communication with the electrically powered flow control actuator 80 to supply electrical signals for controlling the actuator 80. The short range, wireless transceiver may be, for example and without limitation, a Bluetooth® protocol wireless transceiver, a ZigBee® protocol wireless transceiver, or any other suitable short range wireless transceiver or WiFi radio type device. The short range, wireless protocol transceiver 84c may optionally communicate wirelessly with a mobile device such as a smartphone or tablet computer collectively indicated as mobile hand-held device 72. Mobile hand-held device 72 can be provided with a software monitoring application 98 that includes the electronic tables 62 having data related to determination of a desired methane gas output flow rate.

The use of ZigBee® protocol wireless transceivers with each combination unit 84 would enable a wireless personal area (e.g., "mesh") network of wellheads to be created at a landfill. In effect, each wellhead assembly 12 would be able to pass information wirelessly, via digital signals, to other close by (e.g., within about 100 meters line-of-sight) wellheads and/or to a central gateway, which is in turn in communication with a network. Still further, each of the combination units 84 could be configured to communicate with a wireless local area network (LAN).

With further reference to FIG. 12, the combination unit 84 may also include a user interface 84d having a display 84d1 and a selection device formed by a keypad/control section 84d2. The keypad/control section 84d2 may be comprised of any collection of controls (e.g., alphanumeric keypad, switches, buttons, dials, etc.) that are useful to enable the operator to program the combination unit 84 to perform a desired operation. A set button 84d3 or like control may be provided as part of the keypad/controls 84d2 or as an independent switch or control. The set button 84d3 may be pressed by the user to "set" or program a specific desired set point for any form of variable at the wellhead, and thus works very much like an autopilot button or a cruise control button on an automotive vehicle. The display 84d1 may be a liquid crystal display (LCD) or a display comprised of LED elements.

The combination unit 84 may also include a non-volatile memory 84e (e.g., RAM) for storing historical data measured by the combination unit 84, or any other data or information that would be helpful for operation and control of the wellhead assembly 12. A communications interface port 84f such as a RS-232 port, RS-422 port, USB port, etc., may also be included to enable external computing devices to be physically coupled to the combination unit 84 for either downloading of recorded data, uploading of firmware, uploading of application programs, or any other function. A battery 84g, either rechargeable (e.g., lithium ion) or non-rechargeable, may be included for powering the electronic components of the wellhead assembly 12, if no AC power is available at the wellhead system. Optionally, a GPS subsystem 84h may be included with the combination unit 84, although in most applications it is anticipated that the mobile hand-held device 72 will have GPS capability. Preferably, the various components of the combination unit 84 are enclosed in a water-tight housing 84i with a suitable, weather-sealed door that can be opened quickly and easily by a user when access to available controls of the combination unit is needed.

As another option, the combination unit 84 could communicate via a 3G or 4G wireless network via a cellular tower 81, or with one or more cloud-based components via a wide area network such as the Internet. Alternatively, the combination unit 84 may be configured to communicate with a satellite 99, and/or to access other cloud-based subsystems via the satellite. FIG. 12 illustrates cloud-based components such as a database 97a containing historical LFG flow information and a monitoring/control station 97b that may also communicate with the combination unit 84. The monitoring/control station 97b may enable a user to adjust flow/pressure settings implemented by the combination unit 84 from a remote location.

The self-regulating LFG wellhead gas flow control valve 30 thus maintains consistent operations for the periods of time between manual setting adjustments by a human operator. A basis for the self-regulation control scheme can be to maintain constant LFG flow rate, or a constant level of vacuum applied to the well head assembly 12 or some combination of flow rate/vacuum and other site specific data (such as barometric pressure, ambient air temperature, etc.). A third basis of control can be a series of selectable control profiles of combinations of vacuum and/or LFG flow which are chosen to match the needs of a particular well head assembly 12, such as keeping the LFG flow rate below 5 scfm but above 1 scfm, or not exceeding a set upper or lower vacuum limit.

The system of FIG. 12 may also enable different "modes" to be implemented. For example, "Mode A" may be a mode where a handle of a manually adjustable flow control valve is adjusted by the user to attain a desired LFG flow or vacuum setting, then the set button 84d3 is used to initiate the controller 84b automatically maintaining the new user set variable, much like a cruise control system in an automotive vehicle or an autopilot control. One first achieves the desired flow or vacuum reading by conventional means, then engages the set button 84d3 to implement the cruise control or autopilot operation. This sequence of setting a specific set point of a variable which is to thereafter be maintained by the controller 84b may also involve first entering a "set" mode, wherein one or more keys or controls on the user interface 84d is selected so that the controller 84b knows that the user wants to manually set a flow variable (e.g., LFG flow, vacuum, etc.). Entering the "set" mode may be necessary so that the controller 84b does not "fight" the manual adjustment that the user makes. When in the "set" mode, the user then turns the valve handle of a manually adjustable flow control valve to achieve the new desired setting. While in the "set" mode the display 84d1 may be used to present information to the user which lets the user know when the desired setting has been reached. At this point the user may then press the "set" button 84d3 to engage the automatic adjustment capability (i.e., the cruise control operation) of the combination unit 84. Alternatively, the user could just leave the automatic adjustment capability of the combination unit 84 turned off and let the manually adjustable flow control valve serve as a simple, uncontrolled valve (i.e., similar to an "open loop" control arrangement). Optionally, a single button (e.g., set button 84d3) could be used sequentially to first enter the set mode with a first press, and with a second press to initiate the automatic control mode after the desired setting is achieved manually.

Another operating mode, for example "Mode B", allows the user to make use the keyboard/controls 84d2 to adjust the LFG flow control valve 30 position through the action of a powered flow control valve actuator (e.g., powered flow control actuator 80) in communication with the combination unit 84. Still further, this operation could be performed by the user by using the mobile hand-held device 72 communicating via Bluetooth® protocol radios, ZigBee® protocol radios or any other suitable WiFi type local radio. An advantage of Mode B is that the user has the option to directly select the LFG flow rate or the applied vacuum that is desired, rather than making manual adjustments and seeing what the flow or vacuum impacts are. This capability is helpful because, for example, at perimeter wells, the goal is often to maintain a minimal vacuum level to meet regulations; little flow is desired because these perimeter wells typically have relatively high oxygen and nitrogen content instead of the high methane content that is desired. With Mode B, the user simply uses the keypad/control 84d2 (or mobile device 72) to set the desired outcome, such as 0.5" water column vacuum.

With the automated control approaches described above, the controller 96b periodically, such as 1-12 times daily, which is user settable, evaluates the current LFG flow rate, temperature and/or vacuum applied to the well head assembly 12. If the current readings are within predetermined bounds of the desired settings, the control circuit is satisfied, and no changes are made, and the process is repeated at the next set interval. If the current readings are found to lie outside the bounds of the desired settings, the controller 84b will make slight, stepwise openings and/or closings of the control valve 30, take new measurements, then adjust again until the new LFG flow control valve setting achieves readings that are within the bounds of the desired settings.

As noted above, the user interface 84d and its display 84d1 are used to enter the desired control target settings and display sensor readings. According to further aspects, a smartphone or tablet such as mobile hand-held device 72 may also be used to communicate control target settings and readings via a Bluetooth® protocol wireless signal or other form of local wireless signal to the wellhead assembly 12.

Another control loop logic approach for any of the above aspects is to use the following control logic scheme within the wellhead self-regulating LFG gas flow control valve 30: 1) periodically, such as 1-12 times daily, "hunt" via directing slight, stepwise openings and closings of gas flow control valve 30, then 2) pausing while taking new measurements, while computing the following ratio: an additional LFG flow rate gained divided by a change in vacuum level applied to the well head assembly 12. As an example, when using integral or stepwise openings of the LFG flow control valve 30, at some point any additional opening of LFG flow control valve 30 can result in higher levels of vacuum applied to the LFG well head assembly 12, but provide a lowered increase in the LFG flow rate than achieved in the prior stepwise openings. One explanation for this is that the current LFG well production capacity has been exceeded in terms of flow rate of high methane content LFG, defined for example as LFG content of over 50% methane. Applying additional, higher levels of vacuum beyond this point may draw additional gas flow, but this additional flow can be from undesirable near and distant leaks in the landfill cap, well casing, piping and connections. Therefore, the purpose of this control logic scheme is to open the LFG flow control valve 30 at the wellhead assembly 12 until a selected or predetermined limit of gas flow/applied vacuum level has been achieved.

Additional variations of the systems described in reference to FIGS. 1-12 include providing a "trim" capability, whereby the operator selects a bias in a final valve position setting to achieve a desired objective for a particular well. This can include biasing toward lower LFG flow rates and/or lower levels of applied vacuum for LFG wells at the perimeter of the landfill, to avoid pulling ambient air into the LFG well and hence the collection system. Such ambient air intrusion dilutes the desired methane concentration, and/or can impair the desired activity level of the anaerobic microorganisms that produce the methane by digesting the organic materials within the landfill. Conversely, a trim setting desired for wells near a center of the landfill may be biased toward slightly higher LFG flow rates and/or higher levels of applied vacuum, to ensure that all produced gases are collected and to reduce emissions into the atmosphere of organic and/or odor-causing compounds.

In addition, a self-regulating LFG flow control valve 30 as described in reference to FIGS. 2, 3, 4 and 9 can further include an O2 (oxygen) sensor 100 which by monitoring allows the operator to keep O2 level below a desired set-point. This avoids air entrainment which occurs by over-drawing or exceeding a maximum LFG flow rate of the well.

Referring to FIG. 13, the self-regulating gas flow control valve 30 as described in reference to FIGS. 2-5 can use a fine flow control valve 102 in place of the LFG pressure drop measurement device 52, thereby also replacing separate elements such as the orifice assembly 28. A stored family of curves provided in table 62 is used to correlate pressure differential readings across the control valve 102 to a gas flow rate by ascertaining a setting of the control valve. One variation of the above is to include a keypad and digital display 104 on the gas flow control valve 30 to enter valve position settings and display sensor readings. Another aspect uses a smartphone or tablet such as mobile hand-held device 72 to communicate settings and readings via Bluetooth® or ZigBee® protocol wireless signals, or via some other form of local wireless signal. In a further aspect a position encoder 106 is provided to indicate the valve position of gas flow control valve 30 to correctly index the pressure drop to stored flow data.

Another advantage that applies to all the embodiments of the system 10 described herein is having the sensors located in the LFG flow stream rather than connected by tubing. When determining a pressure differential across a flow element (e.g., orifice plate), or when taking a vacuum reading, present day systems typically locate the sensor(s) with the other electronics inside a sealed enclosure or box, and then connect the sensor(s) to the actual sensing point(s) in a discharge conduit with one or more lengths of tubing. This conventional approach has been popular probably because of its simple design, and because of the low cost associated with having circuit board mounted sensors and the desire to use one sealed box for the electronics. However, this conventional sensor configuration can cause measurement inaccuracies. This is especially so when high humidity is present in the gas flow stream; the lengths of connecting tubing are highly susceptible to condensing conditions. At the very least, this creates pockets of liquid within the tubing lengths that distorts the measurements obtained, which in this application are most commonly measured in inches of water column. The fact that the common range of measurement in inches of water column can include readings such as 0.1" to 0.5" means that even a small pocket of condensed water in a length of tubing can introduce a significant source of error in a vacuum reading. Additionally, this condensation inside the tubing can lead to additional concerns such as freezing in the tubing or freezing of the sensor(s), which can easily damage the sensor(s). With the various embodiments of the system 10 discussed herein, the sensor face is presented as being flush or near flush with the internal surface of the flow conduit (i.e., discharge pipe extension 26 in FIG. 2). This flush, or near flush, mounting of a face of each of a pair of pressure sensors 84a1 with the inside wall 26a of the pipe extension 26, or a flush mounting of a face of a vacuum sensor 84a2, such as shown in FIG. 12a, does not produce any intrusion of the sensor heads into the flow stream. In this manner there is no chance of the sensors themselves disturbing the flow patterns, and therefore influencing any differential pressure readings obtained using the system 10. Similarly, mounting the single vacuum sensor 84a2 at the pipe extension 26 would provide the same benefit because of the elimination of the tubing length that would otherwise be needed. With either pressure sensors or a vacuum sensor, the sensor(s) may be mounted directly as shown in FIG. 12a and then coupled to a circuit board that the combination unit 84 components are mounted on via discrete electrical wires. Alternatively, one or more sensors could be mounted on a separate circuit board of a distinct sensing module, with the sensing module positioned on the pipe extension 26 such that the sensing component of the sensor (or sensors) is/are disposed parallel with the inside wall 26a of the pipe extension. The sensing module may then be coupled via a suitable cable, or even an edge connector, to the circuit board of the combination unit 84. Still further, the entire combination unit 84, incorporating one, two or more strategically located sensors supported from a circuit board thereof, and projecting from one side thereof, may be mounted directly on the pipe extension 26 so that the sensor(s) project into pre-formed openings in the pipe extension. Such an arrangement could be used in combination with one or more other sensors which are coupled by an independent electrical cable to the circuit board. Still further, it will be appreciated that sensor 84a2 may, and in actual practice would likely be, co-incident with one or the other of sensors 84a1.

While the sensors discussed in connection with FIG. 12a were explained as being pressure and vacuum sensors, it will be appreciated that the various embodiments of the system 10 are not limited to the use of only pressure and vacuum sensors. The system 10 may incorporate temperature, oxygen and various other sensors either mounted directly on the discharge pipe 26 as shown in FIG. 12a, possibly on a circuit board of the combination unit 84, or in any other suitable configuration.

In lieu of a battery 84g, a solar panel 84j could be disposed in a vicinity of the wellhead assembly 12, and be placed in electrical communication with the combination unit 84. The solar panel 84j may potentially be used to power the various components of the combination unit 84 or simply to periodically recharge the battery 84g.

Referring now to FIG. 14, a flowchart 200 illustrating one sequence of operation for the system 10 of FIG. 12 is shown.

This sequence of operation will be presumed to form "Mode B" operation mentioned above, or what amounts to a closed-loop type, real time control system for monitoring the user set point of a flow related variable. Simply for the sake of illustration, the flow related variable will be assumed to be LFG flow through the flow control valve 30, although it will be appreciated that applied vacuum or any other flow related variable could potentially be set and controlled using the methodology shown in FIG. 14.

At operation 202 a check is made by the controller 84b to determine if the programming mode has been entered. This may involve the controller 84b detecting that the user has pressed the set button 84d3 a first time. If the answer at operation 202 is "No", then operation 210 is performed, which is essentially causing the controller 84b to use the appropriate sensor or subsystem to take a reading of the LFG flow. However, if the check at operation 202 produces a "Yes" answer, indicating the user has implemented the program mode, then at operation 204 the controller 84b obtains the user input for the LFG flow to be used as the set point during "autopilot" control of the LFG flow. This may involve the controller 84b continuously reading a specific sensor or transducer subsystem 84a while the user is making adjustments to reach the desired set point.

At operation 206, the controller 84b of the system 10 periodically checks to determine if the set button 84d3 has been pressed again. If not, the controller 84b keeps monitoring the adjustment being made by the user. If the check at operation 206 produces a "Yes" answer, indicating that the select button 84b3 has been pressed a second time, then if necessary the controller 84b uses the flow control actuator 80 to adjust the LFG flow control valve 30 as needed to achieve the selected set point. It may be that the user has manually adjusted the flow control valve 30, in which case the controller 84b may at that point read some variable (e.g., differential pressure across the orifice plate) which corresponds to the present LFG flow control valve 30 position, which the controller 84b will thereafter control to maintain it at the current reading.

One issue that may require addressing is "out of range" conditions where the system 10 is trying to open the flow control valve 30 when it is already fully open. The present disclosure contemplates addressing this situation by incorporating limit sensors that detect this issue and then alert the user with an error message, which could simply be a blinking LED on the user interface 84d. Another option is sending a wireless message from the combination unit 84 to the hand held mobile device 72 informing the user that a "fully open" error condition exists. It is expected that an optimum solution will incorporate a mechanism for the combination unit 84 to be able to determine flow control valve 30 positions, so the system 10 can record how much (if any) the flow control valve 30 was changed during each control operation (i.e., each wake-up step). These time-stamped valve control changes would also likely become valuable data for the development of predictive control algorithms that could be used on manual set valves as a service, etc. Another option is the use of a stepper motor to adjust the position of the flow control valve 30. The use of a stepper motor enables the flow control valve 30 position to be correlated to discrete "steps" of the stepper motor, which makes it easy for controller 84b to track and monitor the position and control range of the flow control valve 30. Another option may be using a gear motor to drive the flow control valve 30, along with an "open" and "closed" limit switches. This embodiment may use run time between fully open and fully closed to establish a position vs. motor operation time (which could also be periodically re-calibrated, e.g., every 50 readings, etc.).

At operation 208 the controller 84b uses the set point input by the user to set the LFG flow control valve 30 as needed, assuming this has not been done manually by the user. At operation 210 the controller 84b begins periodically reading the necessary variable (e.g., differential pressure across the orifice plate) to monitor the LFG flow through the wellhead assembly 12. This periodic reading may be made by the controller 84b possibly every hour or maybe 12 times or so per day, or at virtually any other desired time interval. In this regard it will be appreciated that the system 10 may be in a "sleep" state for the greater portion of each day, and may "wake" at predetermined times (e.g., every hour on the hour, or every other hour) to perform a required measurement and make, if necessary, a required flow control valve 30 adjustment. The control set point may be checked at the start of each "wake up". Measuring of the parameters (pressure, vacuum, etc.) may be performed over a short time interval, for example over 1-20 seconds and then averaged, and then the decision to adjust the flow control valve 30, and by what increment, may be made by the controller 84b, if needed, to maintain the current set point. Once the controller 84b determines that the control parameter (e.g. pressure, vacuum, etc.) again is in accordance with the set point, the system 10 re-enters the "sleep" state until the next wake up time is reached.

At operation 212 the controller 84b makes a check to determine if the flow related variable is still in accordance with the user set point. If it is, then operation 202 is repeated. If the check at operation 212 indicates that the flow related variable is no longer in accordance with the set point, then the controller 84b uses the powered flow control actuator 80 to adjust the LFG flow control valve 30 as needed to bring the flow related value back in line with the value associated with the set point. Another check is then made by the controller 84b at operation 212 to determine if the flow related value is now back in line with the set point value and, if so, then operation 202 is repeated.

It will be appreciated that the methodology set forth in the flowchart 200 of FIG. 14 is just one example as to how the various components of the system 10 may be implemented to achieve a closed loop control over the user input set point, much like an "autopilot" or "cruise control" arrangement on a vehicle. In actual practice, the methodology of the present disclosure may involve checking a plurality of sensors and having the controller 84b use one or more stored algorithms to determine if a flow related variable is still in accordance with the user implemented set point.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A landfill gas well control system for use with a wellhead assembly to control a flow of landfill gas from a landfill well, the system comprising:
   a landfill gas (LFG) wellhead flow control valve operably associated with the wellhead assembly;
   a flow control actuator operably associated with the wellhead assembly for controlling movement of the LFG flow control valve;
   a sensor operably associated with the wellhead assembly for sensing a flow related variable associated with the landfill gas;
   a combination unit including a housing and being secured to the wellhead assembly to be supported by the wellhead assembly above a ground surface to enable visual access by an individual, the combination unit including:
      a controller housed within the housing and operably associated with the flow control actuator and the sensor for controlling the flow of the landfill gas through the wellhead assembly;
      a user interface present on the housing and including a set selection for enabling a set point associated with the flow related variable, which is to be controlled by the system, to be input to the system by a user;
      a non-volatile memory housed in the housing and in communication with the controller for storing LFG flow related data collected during operation of the wellhead assembly; and
      wherein the controller thereafter operates to control the LFG flow control valve as needed, using the stored LFG flow related data, to maintain the set point in an autopilot-like fashion.

2. The system of claim 1, further comprising a wireless, hand-holdable personal electronic device configured to communicate with the controller, the wireless, hand-holdable device including a software monitoring application having a table, the table having data correlating related to helping a user determine a desired landfill gas output flow rate.

3. The system of claim 1, wherein the flow control actuator comprises an electronically controlled, powered flow control device actuator.

4. The system of claim 1, wherein the user interface includes an alphanumeric keyboard.

5. The system of claim 1, wherein the user interface includes a display.

6. The system of claim 1, wherein the housing further comprises an interface port having at least one of:
   an RS-232 interface;
   an RS-422 interface; and
   a USB interface.

7. The system of claim 1, wherein the sensor comprises a transducer for sensing at least one of pressure or applied vacuum.

8. The system of claim 1, wherein the housing further comprises a battery for powering the system.

9. The system of claim 1, wherein the housing further comprises a short range, wireless, digital transceiver for enabling the controller to communicate with additional wellheads which form a network of independent wellheads at a landfill.

10. The system of claim 1, wherein the combination unit of the system is configured to communicate with at least one cloud-based subsystem.

11. The system of claim 1, wherein the combination unit communicates with the flow control actuator to control the flow control actuator.

12. A landfill gas well control system for use at a wellhead assembly of a landfill well to control a flow of landfill gas from a landfill well, the system comprising:
- a landfill gas (LFG) flow control valve operably associated with the wellhead assembly;
- a discharge pipe operably associated with the wellhead assembly, through which the landfill gas flows;
- an electrically powered flow control actuator, operably associated with the wellhead assembly, for controlling movement of the LFG flow control valve;
- a sensor operably associated with the wellhead assembly for sensing a flow related variable;
- the sensor being located on the discharge pipe so as to have a sensor face thereof located at least one of flush with an internal surface of the discharge pipe or nearly flush with the internal surface;
- a combination unit having a housing secured to the wellhead assembly, the combination unit being in communication with the electrically powered flow control actuator, the housing of the combination unit being attachable to and supported by the discharge pipe above a ground surface to enable visual access by an individual, and including:
  - a controller in communication with the sensor and the electrically powered flow control actuator;
  - a non-volatile memory in communication with the controller for storing collected LFG flow related data;
  - a user interface in communication with the controller and including a set selection for enabling a set point associated with the flow related variable, which is to be controlled by the system, to be input to the combination unit by a user;
  - a power source for powering the controller and the non-volatile memory; and
  - wherein the controller thereafter operates to control the LFG flow control valve as needed to maintain the set point in an auto pilot-like fashion.

13. The system of claim 12, further comprising a flow measurement element provided at the LFG flow control valve producing differential pressures proportional to the landfill gas flow (LFG) rate, the differential pressures converted to signals for use by the controller in controlling positioning of the LFG flow control valve and being communicated as needed to the controller to maintain the set point.

14. The system of claim 12, further comprising a mobile hand-held personal electronic device operating in wireless communication with the combination unit, the mobile hand-held personal electronic device including stored information which assists the user in determining a flow control valve position to achieve a desired LFG flow rate through the LFG flow control valve.

15. The system of claim 12, wherein the combination unit further includes a low power, short range, wireless digital radio for communicating wirelessly with an external subsystem.

16. The system of claim 15, wherein the digital radio is used to communicate wirelessly with one or more other additional wellheads in a mesh network of wellheads at the landfill.

17. A method for controlling a flow of a landfill gas (LEG) through a wellhead assembly at a landfill well, the method comprising:
- arranging a discharge pipe to receive the landfill gas flowing out from the landfill well;
- securing a combination unit having a housing to the discharge pipe such that the combination unit is supported from the discharge pipe and arranged above a ground surface for visual access by an individual;
- providing a landfill gas (LFG) flow control valve;
- using a flow control actuator for controlling movement of the LFG flow control valve;
- using a sensor for sensing a flow related variable;
- arranging the sensor on the discharge pipe so as to have a sensor face thereof located at least one of flush with an internal surface of the discharge pipe or nearly flush with the internal surface;
- using a controller housed within the housing of the combination unit to electronically communicate with the sensor and to control the flow control actuator;
- using a non-volatile memory housed within the housing to store collected LFG flow related data;
- using a user interface on the housing, the user interface including a set selection for enabling a set point associated with the flow related variable to be controlled, to be input by a user; and
- using the controller to thereafter control the flow control actuator, using the collected LFG flow related data, to in turn control the LFG flow control valve, as needed to maintain the set point input by the user in an auto pilot-like fashion.

18. The method of claim 17, further comprising using a personal electronic device to communicate with the controller and to assist in controlling operation of the LFG flow control valve.

19. The method of claim 17, further comprising controlling at least one of:
- LFG flow rate; or
- vacuum being applied to the wellhead.

* * * * *